US012632711B2

(12) United States Patent
Jiang

(10) Patent No.: US 12,632,711 B2
(45) Date of Patent: May 19, 2026

(54) METHOD, APPARATUS, COMPUTING DEVICE AND MEDIUM FOR QUANTIZING NEUTRAL NETWORK MODEL

(71) Applicant: DOUYIN VISION CO., LTD., Beijing (CN)

(72) Inventor: Yongsen Jiang, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 753 days.

(21) Appl. No.: 17/928,713

(22) PCT Filed: Nov. 7, 2022

(86) PCT No.: PCT/CN2022/130432
§ 371 (c)(1),
(2) Date: Nov. 30, 2022

(87) PCT Pub. No.: WO2024/021361
PCT Pub. Date: Feb. 1, 2024

(65) Prior Publication Data
US 2024/0220782 A1     Jul. 4, 2024

(30) Foreign Application Priority Data

Jul. 29, 2022    (CN) .......................... 202210910943.2

(51) Int. Cl.
| | |
|---|---|
| *G06F 7/00* | (2006.01) |
| *G06F 17/00* | (2019.01) |
| *G06N 3/0495* | (2023.01) |

(52) U.S. Cl.
CPC .................................. *G06N 3/0495* (2023.01)

(58) Field of Classification Search
CPC .................................................... G06N 3/0495
(Continued)

(56) References Cited

U.S. PATENT DOCUMENTS

| | | | | |
|---|---|---|---|---|
| 11,615,304 B1 * | 3/2023 | Palkar | .................... | G06V 20/52 |
| | | | | 382/156 |
| 11,645,493 B2 * | 5/2023 | Burger | ................. | G06N 3/0495 |
| | | | | 706/23 |

(Continued)

FOREIGN PATENT DOCUMENTS

| | | |
|---|---|---|
| CN | 110717585 A | 1/2020 |
| CN | 110799994 A | 2/2020 |

(Continued)

OTHER PUBLICATIONS

Gulati, A. et al., "Conformer: Convolution-augmented Transformer for Speech Recognition," arXiv:2005.08100v1, May 16, 2020, 5 pages.

(Continued)

*Primary Examiner* — Pavan Mamillapalli
(74) *Attorney, Agent, or Firm* — Alleman Hall LLP

(57) ABSTRACT

A method comprises updating a neural network model based on a training dataset; adjusting a first set of parameters of a first part of the updated neural network model to being within a first range, and adjusting a second set of parameters of a second part of the updated neural network model to being within a second range, a size of the second range exceeding that of the first range. The method further comprises quantizing the adjusted first set of parameters with a first number of bits and the adjusted second set of parameters with a second number of bits, the second number being greater than the first number. In this way, the parameters are quantified in differentiated manners in combination with a training process, and the compression efficiency and execution efficiency of the neural network model may be improved while maintaining the parameter precision and model performance.

16 Claims, 6 Drawing Sheets

(58) Field of Classification Search
USPC ............................................................ 706/27
See application file for complete search history.

(56) References Cited

U.S. PATENT DOCUMENTS

| | | | | |
|---|---|---|---|---|
| 12,099,915 | B2 * | 9/2024 | Boo | G06N 3/0495 |
| 2019/0122100 | A1 * | 4/2019 | Kang | G06N 3/063 |
| 2019/0340492 | A1 | 11/2019 | Burger et al. | |
| 2020/0257960 | A1 * | 8/2020 | Gabriel | G06N 3/0464 |
| 2020/0311552 | A1 * | 10/2020 | A | G06N 3/092 |
| 2021/0286688 | A1 * | 9/2021 | Liu | G06F 11/1476 |
| 2021/0326710 | A1 * | 10/2021 | Wang | G06N 3/084 |
| 2023/0229895 | A1 * | 7/2023 | Nunes Coelho, Jr. | G06N 3/0985 |
| | | | | 706/27 |
| 2023/0306255 | A1 * | 9/2023 | Charlaix | G06N 3/063 |
| 2024/0220782 | A1 * | 7/2024 | Jiang | G06N 3/0455 |

FOREIGN PATENT DOCUMENTS

| | | |
|---|---|---|
| CN | 111582432 A | 8/2020 |
| CN | 113610709 A | 11/2021 |
| CN | 114139683 A | 3/2022 |

OTHER PUBLICATIONS

European Patent Office, Extended European Search Report Issued in Application No. 22808581.7, Apr. 4, 2024, Germany, 9 pages.

Gholami, A. et al., "A Survey of Quantization Methods for Efficient Neural Network Inference," arXiv:2103.13630v3, Jun. 21, 2021, 33 pages.

Ding, S. et al., "4-bit Conformer with Native Quantization Aware Training for Speech Recognition," arXiv:2203.15952v1, Mar. 29, 2022, 5 pages.

ISA China National Intellectual Property Administration, International Search Report Issued in Application No. PCT/CN2022/130432, Apr. 19, 2023, 3 pages.

* cited by examiner

100

130

120

TRAINING DATASET

110

140

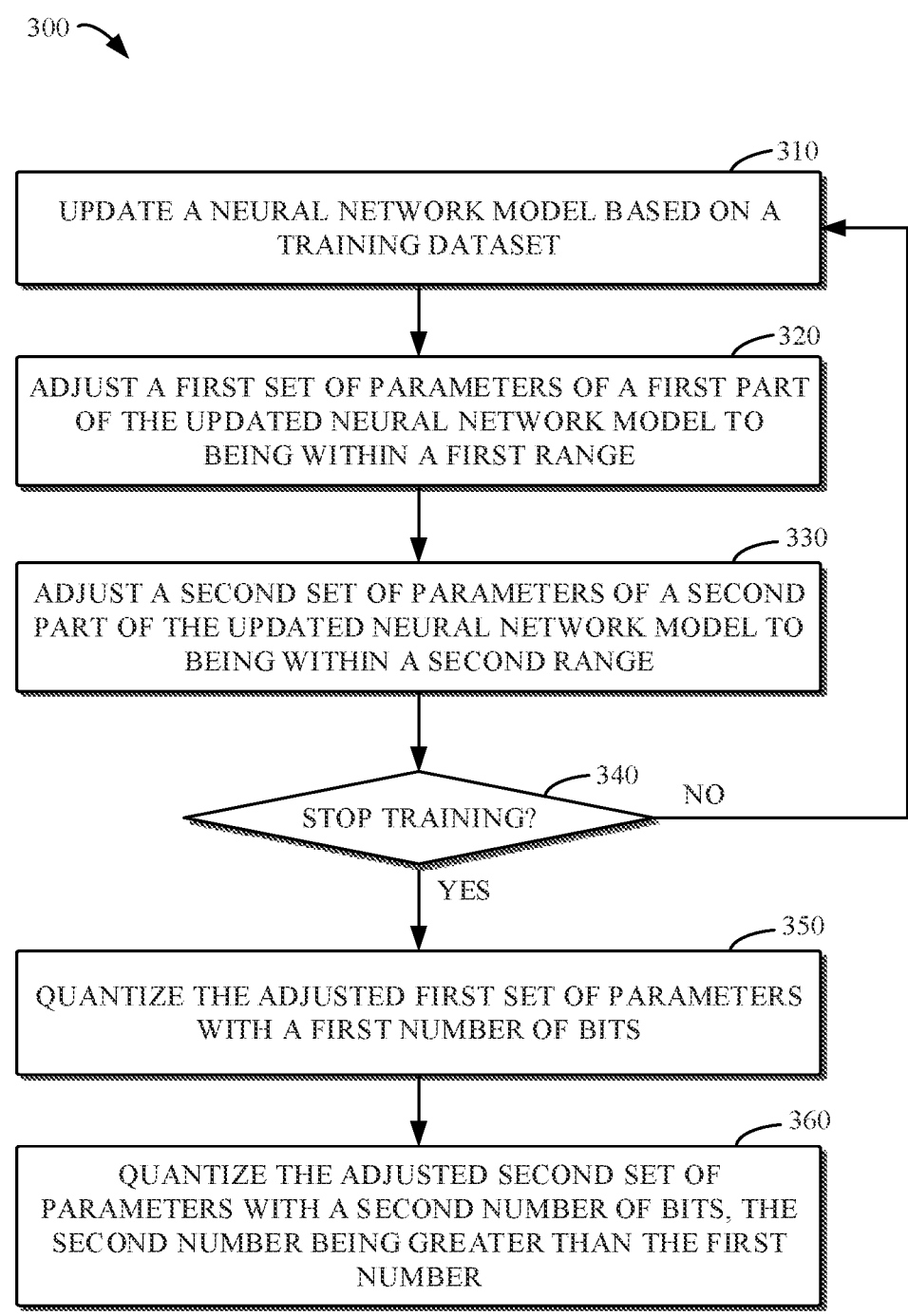

300

310
UPDATE A NEURAL NETWORK MODEL BASED ON A
TRAINING DATASET

320
ADJUST A FIRST SET OF PARAMETERS OF A FIRST PART
OF THE UPDATED NEURAL NETWORK MODEL TO
BEING WITHIN A FIRST RANGE

330
ADJUST A SECOND SET OF PARAMETERS OF A SECOND
PART OF THE UPDATED NEURAL NETWORK MODEL TO
BEING WITHIN A SECOND RANGE

340
STOP TRAINING?                 NO

YES

350
QUANTIZE THE ADJUSTED FIRST SET OF PARAMETERS
WITH A FIRST NUMBER OF BITS

360
QUANTIZE THE ADJUSTED SECOND SET OF
PARAMETERS WITH A SECOND NUMBER OF BITS, THE
SECOND NUMBER BEING GREATER THAN THE FIRST
NUMBER

FROM
BLOCK
350

510

UPDATE THE SECOND SET OF PARAMETERS WITH
THE TRAINING DATASET WHILE KEEPING THE
QUANTIZED FIRST SET OF PARAMETERS
UNCHANGED

520

ADJUST THE SECOND SET OF PARAMETERS TO
BEING WITHIN THE SECOND RANGE

530

TRAINING COMPLETED?          NO

YES

TO
BLOCK
360

600

700

METHOD, APPARATUS, COMPUTING DEVICE AND MEDIUM FOR QUANTIZING NEUTRAL NETWORK MODEL

FIELD

Embodiments of the present disclosure generally relate to the technical field of computer science, and more specifically, to a method, apparatus, computing device, computer-readable storage medium and computer program product for quantizing a neural network model.

BACKGROUND

With the development of computer science and technology, neural network models are widely used in image processing, voice recognition, text processing and so on. An audio, an image or a piece of text may be provided to a trained neural network model, which produces a corresponding processing result, for example, converts voices to text, or recognizes an object in the image.

The neural network model may be deployed in an online or offline system. Regarding the online system, the neural network model is located at a server, and a terminal device uploads data to be processed to the server, and the server performs the task. In the offline system, the model is sent to the terminal device (such as a mobile phone, an embedded system, etc.), and the terminal device runs the model. However, the hardware performance of the device is usually relatively weak, and a large model may cause the possibility of failing to send the model to increase. Usually, a quantization technique is used to reduce the size of the model. However, it is difficult for a conventional quantization technique to efficiently compress the model while meeting performance requirements for the model.

SUMMARY

In view of this, embodiments of the present disclosure propose a method, apparatus, computing device, computer-readable storage medium and computer program product for quantizing a neural network model.

According to a first aspect of the present disclosure, there is provided a method for quantizing a neural network model. The method comprises: updating the neural network model based on a training dataset; adjusting a first set of parameters of a first part of the updated neural network model to being within a first range; and adjusting a second set of parameters of a second part of the updated neural network model to being within a second range, a size of the second range exceeding that of the first range. The method further comprises quantizing the adjusted first set of parameters with a first number of bits. The method further comprises quantizing the adjusted second set of parameters with a second number of bits, the second number being greater than the first number. In this way, the parameters of the neural network model are quantified in differentiated manners in combination with a training process, and the compression efficiency and execution efficiency of the neural network model may be improved while maintaining the parameter precision and model performance.

In some embodiments of the first aspect, the method may further comprise: before quantizing the adjusted second set of parameters with the second number of bits, iteratively updating the second set of parameters based on the training dataset and the quantized first set of parameters. In this way, the neural network model may be fine-tuned to improve the performance of the neural network model.

In some embodiments of the first aspect, iteratively updating the second set of parameters based on the quantized first set of parameters may comprise: iteratively updating the neural network model based on the training dataset while keeping the quantized first set of parameters unchanged, wherein the iteratively updated neural network model comprises an iteratively updated second set of parameters. In this way, the neural network model can be retrained to compensate for the performance loss caused by the quantization of some parameters.

In some embodiments of the first aspect, adjusting the first set of parameters of the first part of the updated neural network model to being within a first range may comprise: adjusting a parameter in the first set of parameters that is greater than an upper limit value of the first range to the upper limit value, and adjusting a parameter in the first set of parameters that is smaller than a lower limit value of the first range to the lower limit value. In this way, the parameters of the neural network model may be limited in a specified range such that the quantized parameters still have a high precision.

In some embodiments of the first aspect, quantizing the adjusted first set of parameters with the first number of bits may comprise: dividing the first range into a plurality of sub-ranges based on the first number, and determine a quantized value of each parameter in the first set of parameters based on the plurality of sub-ranges and the value of each parameter. In this way, the parameters may be efficiently quantized to achieve efficient compression of the neural network model.

In some embodiments of the first aspect, the method may further comprise: generating a quantized neural network model based on the quantized first set of parameters and the quantized second set of parameters, and transmitting the quantized neural network model to a terminal device. In this way, a light weighted neural network model may be generated and deployed at the terminal device to achieve an offline system.

In some embodiments of the first aspect, the training dataset may comprise at least one of audio data, image data, video data, and text data. In this way, the neural network models may be applied to application fields such as audio processing, image processing, video processing and text processing and complete specific tasks.

In some embodiments of the first aspect, the first number may be 4 and the second number may be 8. In this way, the first set of parameters may have a compression rate higher than the second set of parameters.

In some embodiments of the first aspect, the first part may comprise a linear transformation-based network, and the first set of parameters may comprise weights for the linear transformation; the second part may comprise a convolutional neural network, and the second set of parameters may comprise parameters of a convolution kernel of the convolutional neural network. In this way, higher compression may be applied to a larger total number of parameters, and less compression may be applied to a less total number of convolutional parameters so that the neural network model on the whole achieves a higher compression rate with less impact on the performance.

In some embodiments of the first aspect, the neural network model may be applicable for voice recognition and include a Transformer-based model.

In some embodiments of the first aspect, the updating the neural network model may comprise updating the neural network model based on a floating point format. In this way, the neural network model may be trained at a high precision.

According to a second aspect of the present disclosure, there is provided an apparatus. The apparatus comprises a training unit, a first adjusting unit, a second adjusting unit, a first quantizing unit and a second quantizing unit. The training unit is configured to update the neural network model based on a training dataset. The first adjusting unit is configured to adjust a first set of parameters of a first part of the updated neural network model to being within a first range. The second adjusting unit is configured to adjust a second set of parameters of a second part of the updated neural network model to being within a second range, a size of the second range exceeding that of the first range. The first quantizing unit is configured to quantize the adjusted first set of parameters with a first number of bits. The second quantizing unit is configured to quantize the adjusted second set of parameters with a second number of bits, the second number being greater than the first number.

Some embodiments of the second aspect may have units that implement the actions or functions described in the first aspect, and can achieve advantageous effects analogous to the first aspect. Such units are not repeatedly described any more herein for the sake of brevity.

According to a third aspect of the present disclosure, there is provided a device comprising at least one processing unit and at least one memory, the at least one memory being coupled to the at least one processing unit and having instructions stored thereon to be executed by the at least one processing unit, the instructions, when executed by the at least one processing unit, causing the computing device to perform the method according to the first aspect of the present disclosure.

According to a fourth aspect of the present disclosure, there is provided a computer-readable storage medium comprising machine-executable instructions that, when executed by a device, cause the device to perform the method according to the first aspect of the present disclosure.

According to a fifth aspect of the present disclosure, there is provided a computer program product comprising machine-executable instructions which, when executed by a device, cause the device to perform the method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements.

FIG. 3 illustrates a flowchart of a process for quantizing a neural network model according to an embodiment of the present disclosure;

4

Figure 4:
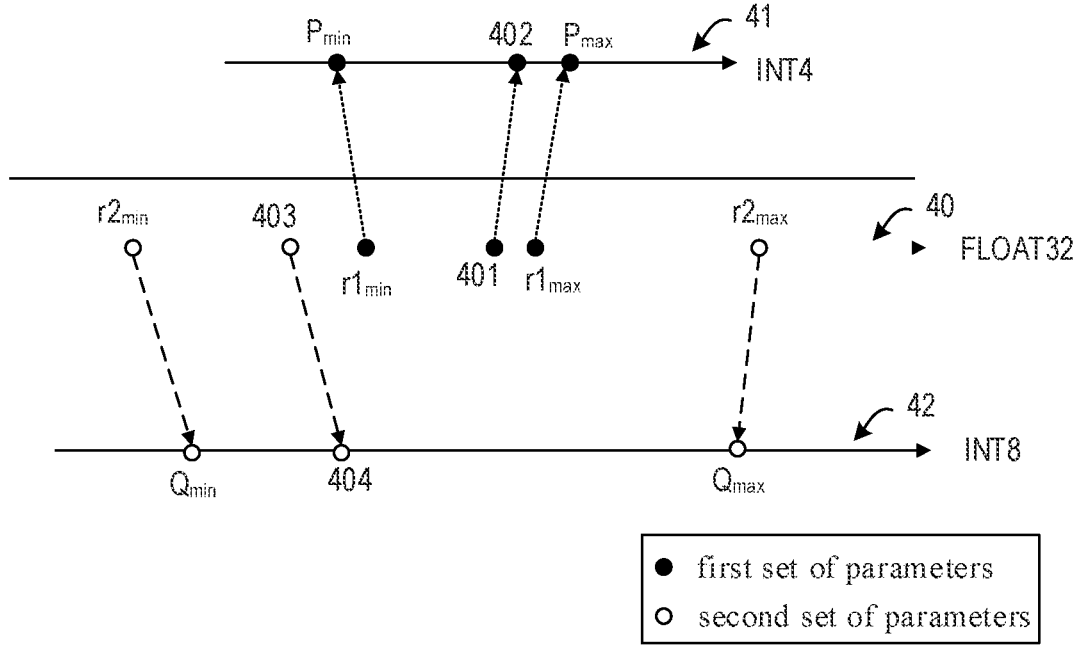
Figure 5:
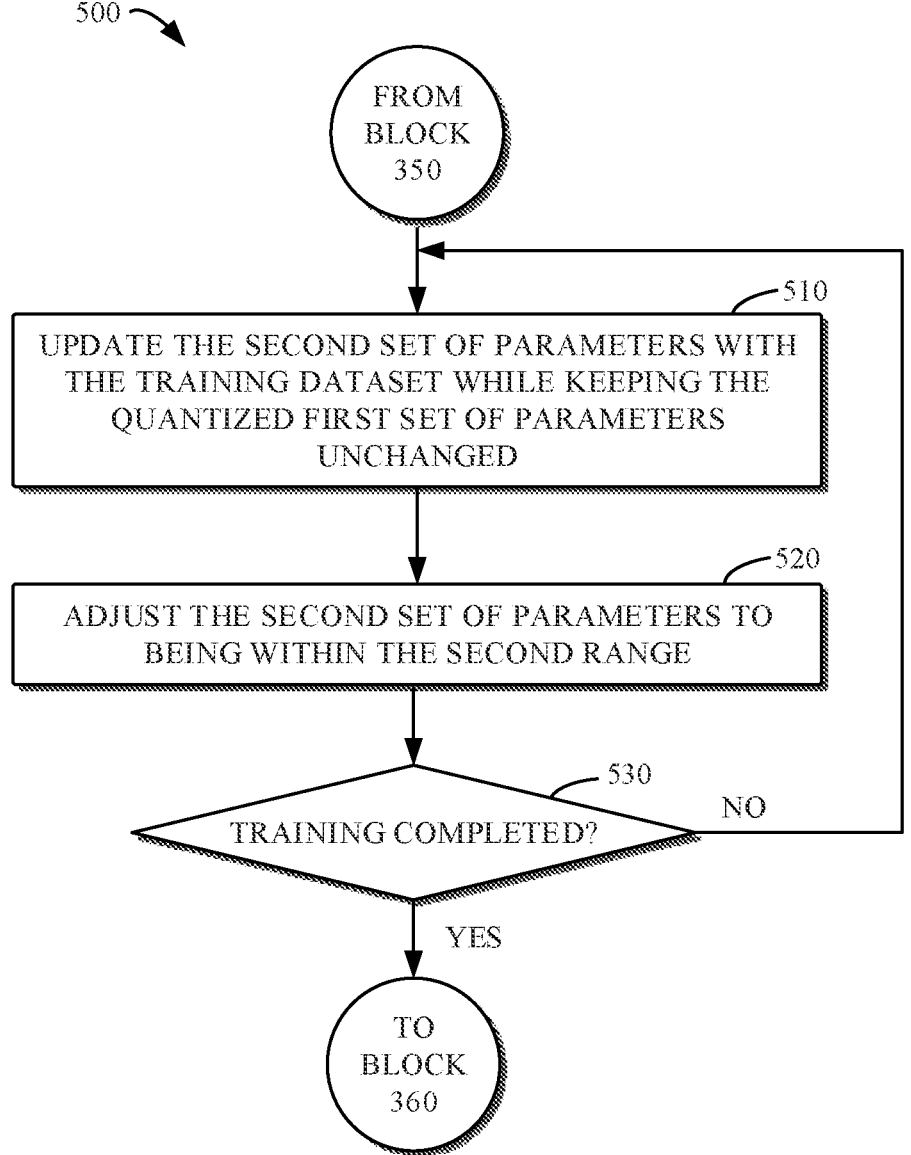
Figure 6:
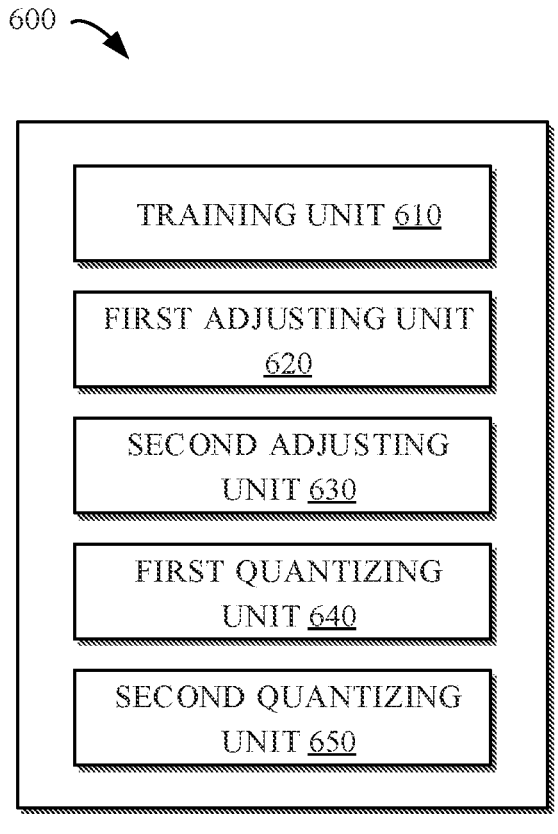
Figure 7:
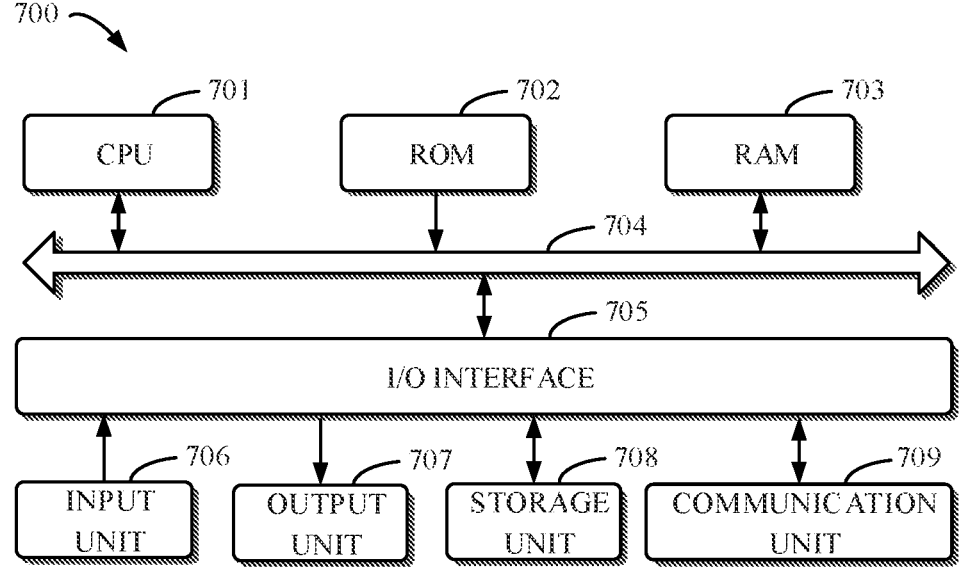

FIG. 4 illustrates a schematic diagram of a parameter quantization method according to an embodiment of the present disclosure;

FIG. 5 illustrates a flowchart of a process for fine-tuning a neural network model according to an embodiment of the present disclosure;

FIG. 6 illustrates a block diagram of an apparatus for quantizing a neural network model according to an embodiment of the present disclosure; and FIG. 7 illustrates a block diagram of an example device that may be used to implement embodiments of the present disclosure.

DETAILED DESCRIPTION OF EMBODIMENTS

It may be appreciated that the data involved in the technical solution (including but not limited to the data itself, the acquisition or use of the data) should comply with the requirements of corresponding laws and regulations and relevant provisions.

Preferred embodiments of the present disclosure will be described as follows in greater detail with reference to the drawings. Although preferred embodiments of the present disclosure are illustrated in the drawings, it is to be understood that the present disclosure described herein may be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "include" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be read as "at least one other embodiment." Terms "a first", "a second" and others may denote different or identical objects. The following text may also contain other explicit or implicit definitions.

It should be noted that the numbers or numerical values used herein are intended to help understand the technique of the present disclosure, not to limit the scope of the present disclosure.

In embodiments of the present disclosure, the term "model" is capable of processing an input and providing a corresponding output. Taking a neural network model as an example, it usually comprises an input layer, an output layer, and one or more hidden layers between the input layer and the output layer. A model used in a deep learning application (also referred to "deep learning model") typically comprises a number of hidden layers, thereby extending the depth of the network. The layers are inter-connected so that the output of a previous layer is used as the input of the next layer, or the output of the latter layer may be fed back to the input of the previous layer. The input layer receives the input for the neural network model, and the output of the output layer is taken as a final output of the neural network model. Each layer of the neural network model comprises one or more nodes (also referred to as nodes or neurons), each node receives an input and generates a corresponding output according to parameters of the model, and the output may form an input of itself or other nodes using a combination of the parameters of the model. The parameters of the model may be updated by training. The trained model can learn the knowledge embodied by its parameters, and can be used for various tasks, such as voice recognition, image recognition, text processing, etc. Herein, the terms "neural network", "model", "network" and "neural network model" may be used interchangeably.

As mentioned above, in the offline system, the neural network model is deployed at the mobile device. When the neural network model needs to be deployed or updated, the model (including its parameters) is sent to the mobile device. If the model is very large, a possibility of failing to send the model increases. On the other hand, the hardware performance of the mobile device may be not suitable for running a large model. Traditionally, a quantization technique is employed to reduce the storage space needed by each model parameter, thereby reducing the size of the model itself. According to some methods, the size of the model may be reduced by changing the parameter from a floating point number (e.g., 32-bit) to an 8-bit integer. However, it is still difficult to meet actual needs. Furthermore, further reduction of the number of bits of the parameters (e.g., 4 bits, 2 bits, etc.) will cause the performance of the model to decrease dramatically, which is undesirable.

In view of this, embodiments of the present disclosure provide an improved quantization technique. The combination of the quantization technique with a model-training process can significantly reduce the size of the neural network model, while the performance of the resultant neural network model is almost not affected. The method according to embodiments of the present disclosure comprises training a neural network model using a training dataset to update parameters of the neural network model. Then, a first set of parameters of a first part of the neural network model is adjusted to being within a first range and a second set of parameters of a second part are adjusted to being within a second range, the second range being greater than the first range. Then, the first set of parameters is quantized to be represented by a first number of bits. The method further comprises quantizing the second set of parameters to be represented by a second number of bits, the second number being greater than the first number. In this manner, the parameters of the neural network model may be quantized in differentiated manners, and the compression efficiency and execution efficiency of the neural network model may be improved while maintaining the parameter precision and model performance.

The implementation details of the embodiments of the present disclosure are described in detail below with reference to FIGS. 1 to 7.

Figure 1:
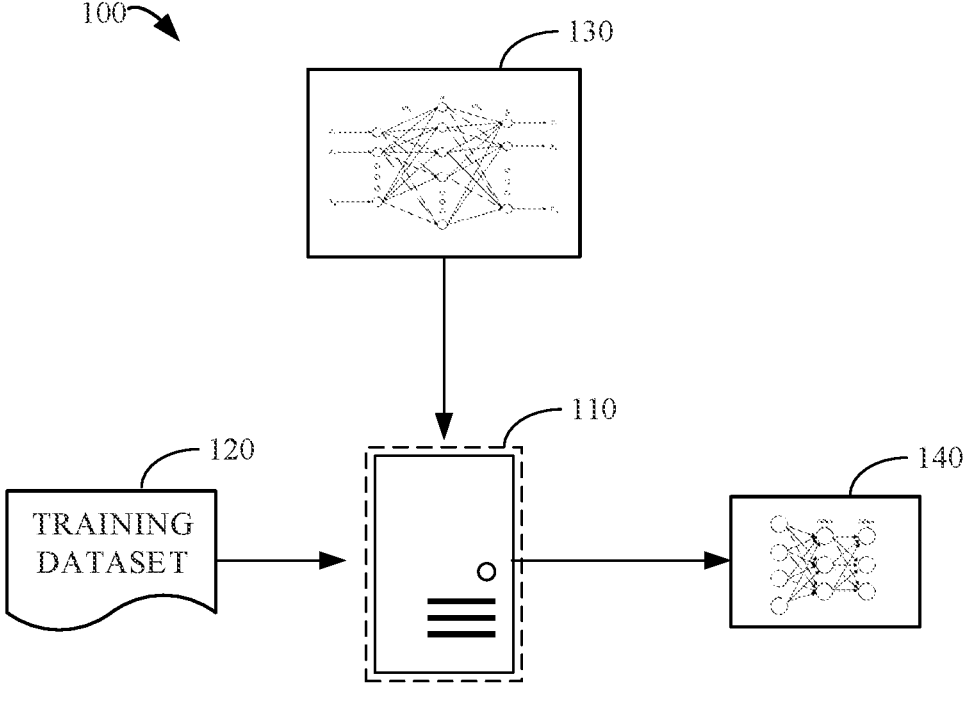
FIG. 1 illustrates a schematic diagram of an example environment in which embodiments of the present disclosure can be implemented.

FIG. 1 illustrates a schematic diagram of an example environment 100 in which embodiments of the present disclosure can be implemented. The environment 100 comprises a computing device 110. The computing device 110 may be any device with a computing capability, such as a personal computer, a tablet computer, a wearable device, a cloud server, a mainframe, a distributed computing system or the like. The computing device 110 may be a single device, or a cluster of multiple devices.

According to embodiments of the present disclosure, the computing device 110 may be used to train and quantize a neural network model 130. As shown, the computing device 110 acquires a training dataset 120. The training dataset 120 may comprise images, video, audio, text, and/or multimedia files, etc. In the case of supervised or semi-supervised training, the training dataset 120 may comprise label information. In the case of unsupervised training, the computing device 110 may not include label information.

The neural network model 130 may comprise but not limited to, a voice recognition model, a text processing model, an optical character recognition (OCR) model, an image classification model, a semantic segmentation model, a target detection model, or other models. The neural network model 130 may be implemented using any suitable network structure, including but not limited to a support vector machine (SVM) model, a Bayesian model, a random forest model, various deep learning/neural network models, such as a deep feedforward neural network, a Convolutional Neural Network (CNN), a Recurrent Neural Network (RNN), an attention mechanism-based transformer model, etc., and combinations thereof. The scope of the present disclosure is not limited in this regard.

The computing device 110 may apply the training dataset 120 to the neural network model 130 to update parameters of neural network model 130, e.g., by a gradient descent method or other training methods. During training, the updated parameters may have a high precision, for example, being represented by a 32-bit floating point number. The computing device 110 may also quantize the parameters of the neural network model 130, and the quantized parameters may occupy less storage space, such as 16 bits, 8 bits, 4 bits or less. The number of bits of the quantized parameters is not limited in the present disclosure. Thereby, a quantized neural network model 140 is generated. The quantized neural network model 140 is reduced as compared to the original neural network model 130. Herein, the quantized neural network model 140 may also be referred to as a lightweight neural network model or a lightweight model. In some embodiments, the quantized neural network model 140 may be sent from the computing device 110 to a mobile device (not shown). Where the neural network model 140 is to be newly deployed, the computing device 110 may send the complete model including model structure information and model parameters to the mobile device. The computing device 110 may only transmit the model parameters that have already changed when the neural network model is already deployed and just needs to be updated.

It should be understood that the environment 100 shown in FIG. 1 is merely one example in which embodiments of the present disclosure may be implemented, and is not intended to limit the scope of the present disclosure. Embodiments of the present disclosure are also applicable to other systems or architectures.

An exemplary process for quantizing the neural network model according to embodiments of the present disclosure is further described below with reference to FIG. 2 through FIG. 5. For ease of illustration, the structure of the exemplary neural network model 130 according to the embodiments of the present disclosure is first described.

Figure 2:
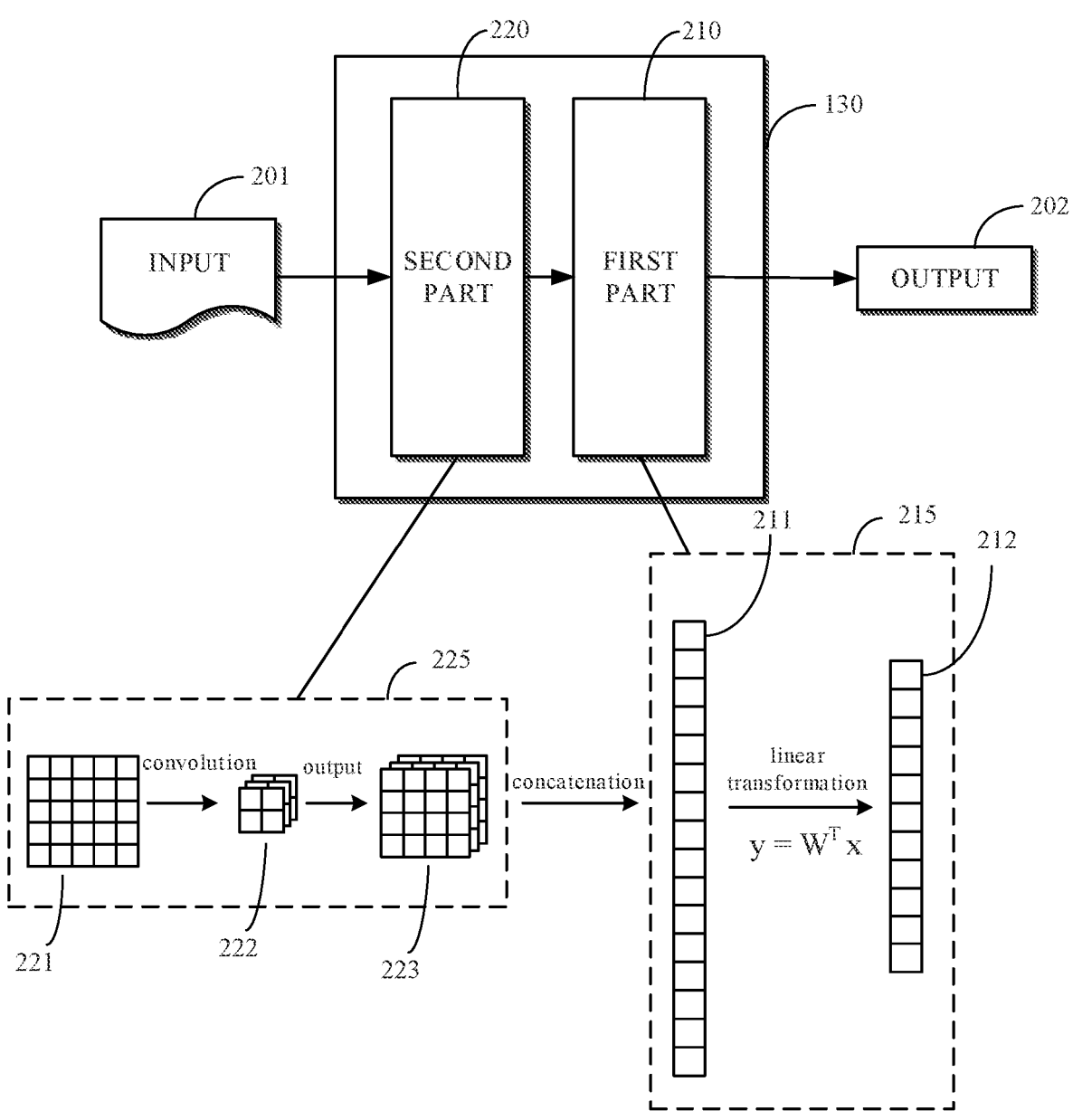
FIG. 2 illustrates a schematic diagram of an example structure of a neural network model according to an embodiment of the present disclosure.

FIG. 2 shows a schematic diagram of an example structure of the neural network model 130 according to an embodiment of the present disclosure. The neural network model 130 comprises a first part 210 and a second part 220. An input 201 is provided to the neural network model 130, and then processed to obtain an output 202.

The input 201 may be part of the data in a test dataset 120 as shown in FIG. 1, and the output 202 may be a predicted result for the input 201. As described above, the training dataset 120 may comprise various types of data such as audio, video, and text. For the convenience of description, audio data will be taken as an example below for description. For example, in a case where the neural network model 130 is a voice recognition model, the input 201 may be an acoustic feature (e.g., based on a Mel spectrum) obtained by extracting the acoustic feature from the voice data. For example, the acoustic feature in the form of a vector (e.g., 40 dimensions, 80 dimensions) may be extracted from one voice frame (10 ms), whereby a series of acoustic features may form multidimensional data as input to the neural network model 130. The output 202 may be a phoneme prediction or word prediction result for the voice. The predicted result may be represented in the form of a vector whose component indicates a probability of the voice being recognized as the corresponding phoneme or word. In this way, the voice may be converted into words. It should be understood that the input 201 may be other types of features, such as pixel representation of an image, text embedding, etc., and the corresponding outputs 202 may be, for example, an image recognition result or a semantic analysis result. The embodiments of the present disclosure are thus used for tasks such as image classification.

Depending on the specific implementation of the neural network model 130, the first part 210 and the second part 220 may comprise different types of network structures.

Exemplarily but non-restrictively, the first part 210 may comprise at least one linear transformation-based network 215, and the second part 220 may comprise at least one convolutional neural network 225. Furthermore, for the sake of brevity, only one linear transformation-based network 215 and one convolutional neural network 225 are shown here, it should be appreciated that the neural network model 130 may contain any number of convolutional neural networks and linear transformation-based networks, and these models may be combined in a way different from the way shown. Additionally, the first part 210 and the second part 220 may comprise other different types of networks.

As shown, the input to the convolutional neural network 225 may be in the form of a matrix 221. As an example, the voice data with duration of 1 second may be divided into 100 frames, and each frame (10 milliseconds) is represented by an 80-dimensional vector, thus, the voice data with duration of 1 second may be represented as a 100×80 matrix. Regarding the matrix 211, at least one convolution kernel 222 is used to perform a convolution operation, thereby obtaining at least one corresponding convolution result 223. Each convolution kernel 212 may have convolution parameters, e.g., a convolution kernel with a size 2×2 comprises 4 parameters, and a convolution kernel with a size 3×3 has 9 parameters.

The convolution result 223 obtained from the convolutional neural network 225 may be concatenated together to obtain a vector 211 which may be transformed into another vector 212 by a linear transformation. The linear transformation may be represented by a weight matrix W. As parameters of the neural network model 130, the weight matrix W comprises weights for transforming from the vector 211 into the vector 212.

As stated above, the number of parameters of the first part 210 and the second part 220 of the neural network model 130 might be quite different. In some embodiments, the neural network model 130 may be or include a Transformer-based network. Taking the Transformer network as an example, it comprises two types of basic structures: convolutional neural networks and linear transformation-based networks. The convolutional neural network generally appears in a front-end down sampling module with fewer parameters, whereas the linear transformation-based network appears in an attention structure of each layer and in a final full connection, accounting for a main part of the number of parameters. On the other hand, distributions of the parameters of the first part and the second part are different, and have different impacts on the performance of the model.

In view of this, in the embodiments of the present disclosure, suitable quantization levels are employed for the first part 210 and the second part 220 respectively in combination with the training process of the neural network model 130. This process will be described below with reference to FIG. 3.

FIG. 3 illustrates a flow diagram of a process 300 for quantizing a neural network model according to an embodiment of the present disclosure. The process 300 may be implemented by the computing device 110 in FIG. 1. For ease of description, the process 300 will be described with reference to FIG. 1 and FIG. 2.

At block 310 of FIG. 3, the computing device 110 updates the neural network model 130 based on the training dataset 120. Herein, updating the neural network model 130 may refer to updating the parameters of the neural network model 130, including a first set of parameters of the first part 210 and a second set of parameters of the second part 220. The parameters of the neural network model 130 may be updated by minimizing the loss caused using a gradient descent method.

At block 320, the computing device 110 adjusts the first set of parameters of the first part 210 of the updated neural network model 130 to being within a first range. The first set of parameters may comprise, for example, weights in a weight matrix W of at least one linear transformation.

At block 330, the computing device 110 adjusts the second set of parameters of the second part 220 of the updated neural network model 130 to being within a second range, the size of the first range being smaller than the size of the second range. The second set of parameters may comprise, for example, parameters of at least one convolution kernel.

It should be appreciated that the actions in blocks 320 and 330 may be performed in parallel or in different orders, which is not limited in the present disclosure.

During the training process, the parameters of the neural network model 130 are represented as for example a 32-bit floating point number and updated. The 32-bit floating point number may represent a considerably large range. However, in most cases, the parameters are distributed in a much smaller range, for example basically around 0, such as [0.25, 0.25], [−0.5, 0.5], [−1, 1] or other ranges. The first set of parameters and the second set of parameters may be adjusted to their respective ranges, i.e., the first set of parameters are adjusted to fall within the first range, and the second set of parameters are adjusted to fall within the second range.

It should be appreciated that the number of bits after parameter quantization reflects the level at which the parameters are compressed. The fewer the number of bits, the fewer possible quantized values, and the higher the compression degree. For example, when the number of bits after quantization is 2, the parameter has a total of 4 possible quantized values. When the number of bits is 4, the parameter has a total of 16 possible values. When the number of bits is 8, the parameter has a total of up to 256 possible values. In order to ensure the precision of the parameter (i.e. a difference between actual parameter values corresponding to two adjacent quantized values, also be referred to as "a resolution"). As for a parameter with a smaller number of bits after the quantization, the parameter may be adjusted in advance to a smaller range of values, and the resolution may be controlled at an expected precision.

As shown in blocks 320 and 330, the first set of parameters and the second set of parameters are adjusted to ranges having different sizes, and the size of the first range for the first set of parameters may be smaller than the size of the range for the second set of parameters size. As an example without limiting, the first range may be [−0.25, 025] and the second range may be [−1, 1].

Specifically, for a parameter in the first set of parameters, if the parameter is greater than an upper limit value (e.g., 0.25) of the first range, the parameter is adjusted to the upper limit value. If the parameter is less than the lower limit value of the first range (for example, −0.25), the parameter is adjusted to the lower limit value. If the parameter is within the first range, the parameter is kept as it is. Similarly, for a parameter in the second set of parameters, if the parameter is greater than the upper limit value of the second range (e.g., 1.0), the parameter is adjusted to the upper limit value. If the parameter is less than the lower limit value of the first range, the parameter is adjusted to the lower limit value (−1.0). If the parameter is within the second range, the parameter is kept as it is.

By controlling the range of parameters, even though the first set of parameters and the second set of parameters are quantized, a satisfactory precision can be achieved.

At block 340, determination is made as to whether to stop training. For example, whether to stop training may be determined by determining whether a convergence condition is met (considering a training time or training result). If the training should not be stopped, the method returns to block 310 to repeatedly perform the actions of blocks 310 to 330 described above using a next batch of training data. If it is determined that the training is to be stopped, the method 300 proceeds to block 340. That is, the actions in blocks 310 to 330 described above may be performed iteratively based on the batches of the training dataset 120 during training until the model converges and the training ends or the training is manually stopped. In other words, each time a batch of training data is used to train the neural network model 130, to update its parameters, the parameters of the first part 210 and the parameters of the second part 220 of the neural network model 130 may be adjusted to being within specified ranges. If the training has not yet ended, the actions of block 310 through block 330 described above are repeatedly performed using the next batch of training data until the training ends.

Then, at block 350, the computing device 110 quantizes the adjusted first set of parameters using a first number of bits. As an example, the first number may be 4, i.e., the first set of parameters are quantized to be 4-bit quantized values (also referred to as 4-bit integer type INT4), resulting in a total of 16 ($2^4$) possible quantized values. It should be understood that the first number may also be other values, such as 2.

An exemplary parameter-quantizing method is illustrated with reference to FIG. 4. As shown in FIG. 4, a number axis 40 in the middle represents parameters and their ranges obtained during or after training, and the parameters on the number axis 40 are of a floating point type, such as a 32-bit floating point number. The first range of the first set of parameters is [$r1_{min}$, $r1_{max}$], and the second range of the second set of parameters is [$r2_{min}$, $r2_{max}$]. The size of the first range is smaller than that of the second range.

A number axis 41 at the top represents values after the first set of parameters are quantized. In a case where 4 bits are used to quantize the first set of parameters, a minimum value $P_{min}$ on the axis 41 may be for example −8, and a maximum value may be for example 7. In some embodiments, the first range may be divided into a plurality of sub-ranges, and the quantized value of each parameter is determined according to the plurality of sub-ranges and the value of each parameter in the first set of parameters.

For example, the first range may be divided equally into 15 ($2^4$−1) sub-ranges, i.e. 14 separation points are inserted, plus two points at the maximum value and minimum value, totally 16 points are obtained. These points correspond to quantized values of −8 to 7 in an ascending order. For each parameter, the quantized value corresponding to a point closest thereto is determined as the quantized value of the parameter. Alternatively, the first range may also be equally divided into 16 (2+) sub-ranges and the quantized value of each parameter is determined according to the sub-range in which the parameter is located. As shown, the minimum value $r1_{min}$ of the first set of parameters on the number axis 40 is quantized as $P_{min}$, a maximum value $r1_{max}$ is quantized as $P_{max}$, and the parameter 401 in the middle of the first range is quantized to be the value 402 on the number axis 41. In the case where the first range is [−0.25, 0.25], the resolution after the first set of parameters are quantized is $\frac{1}{32}$.

Further referring to FIG. 3, at block 360, the computing device 110 quantizes the adjusted second set of parameters using a second number of bits, the second number being greater than the first number. As an example, the second number may be 8, i.e., the second set of parameters are quantized as 8-bit quantized values (also referred to as 8-bit integer type INT8), resulting in a total of 256 ($2^8$) possible quantized values. It should be appreciated that the second number may also be other value greater than the first number.

Referring again to FIG. 4, the number axis 42 at the bottom represents values after the second set of parameters are quantized. In a case where 8 bits are used to quantize the first set of parameters, the minimum value $Q_{min}$ on the number axis 42 may be for example −128, and the maximum value may be for example 127. Similarly, the second range may be divided into a plurality of sub-ranges, and the quantized value of each parameter may be determined according to the plurality of sub-ranges and the value of each parameter in the second set of parameters. The specific process is similar to that of the first set of parameters, and will not be repeated here. As shown, a minimum value $r2_{min}$ of the second set of parameters on the number axis 40 is quantized as $Q_{min}$, a maximum value $r2_{max}$ is quantized as $Q_{max}$, and the parameter 403 in the middle of the second range is quantized as the value 404 on the number axis 42. In the case where the second range is [−1,1], the resolution after the first set of parameters are quantized is $\frac{1}{128}$.

In order to better understand the embodiments of the present disclosure, the following test examples are provided for further illustration. It is assumed that the first part of the neural network model 130 is a linear transformation-based network having 10M parameters, and the second part is a convolutional neural network having 200K parameters. Each parameter is a 32-bit floating point number before quantization, so the total size of the model is about 40.8 MByte. When a traditional 8-bit quantization scheme is used uniformly, each parameter is quantized as 8 bits, so the total size of the model is reduced to 25% of the original size, or 10.2 MByte. According to an embodiment of the present disclosure, the size of the linear transformation network is reduced to ⅛ (4 bits) of the original size, and the convolutional neural network is reduced to ¼ of the original size, so the total size of the model is about 5.2 Mbytes. As compared with the traditional quantization scheme, the size of the model is significantly reduced, and the actual performance of the model is nearly not affected. On the other hand, the running speed of the neural network model according to the embodiments of the present disclosure may also be significantly improved.

In some embodiments, in order to further ensure the performance of the quantized neural network model 140, retraining may be performed based on the quantized first set of parameters after the first set of parameters is quantized, to achieve the fine-tuning of the neural network model 130.

FIG. 5 illustrates a flow diagram of a process 500 for fine-tuning the neural network model according to an embodiment of the present disclosure. The process 500 may be performed after block 350 but before block 360 of FIG. 3.

At block 510, the computing device 110 updates the second set of parameters using the training dataset while keeping the quantized first set of parameters unchanged. For example, the computing device 130 updates the second set of parameters by using a batch of training data. In this way, the loss of partial performance caused by the quantization of the first set of parameters is compensated.

At block 520, the computing device 110 adjusts the second set of parameters to being within the second range. This is similar to the action of block 330 in FIG. 3 and description thereof will not be repeated.

At block 530, the computing device 110 determines whether training is completed. If the training is not yet completed, the process returns to block 510 to continue training to update the second set of parameters. If the training is completed, the process proceeds to block 360 in FIG. 3 to perform quantization of the second set of parameters.

Then, the computing device 110 may generate a quantized neural network model 140 based on the quantized first set of parameters and the quantized second set of parameters, and transmit the quantized neural network model 140 to a terminal device. Since such a lightweighted neural network model is deployed at the terminal device to implement an offline system, an inference task can be performed even in absence of network.

The method or process for quantizing a neural network model according to embodiments of the present disclosure is described above with reference to FIG. 1 to FIG. 5. As compared with the existing solution, in embodiments of the present disclosure the parameters of the neural network model is quantified in differentiated manners in combination with the training process, and the compression efficiency and execution efficiency of the neural network model may be improved while maintaining the parameter precision and model performance.

FIG. 6 illustrates a block diagram of an apparatus 600 for quantizing a neural network model according to an embodiment of the present disclosure. The apparatus 600 may be arranged at the computing device 110.

As shown in the figure, the apparatus 600 comprises a training unit 610, a first adjusting unit 620, a second adjusting unit 630, a first quantizing unit 640 and a second quantizing unit 650. The training unit 610 is configured to update the neural network model based on a training dataset. The first adjusting unit 620 is configured to adjust a first set of parameters of a first part of the updated neural network model to being within a first range. The second adjusting unit 630 is configured to adjust a second set of parameters of a second part of the updated neural network model to being within a second range, the size of the second range exceeding that of the first range. The first quantizing unit 640 is configured to quantize the adjusted first set of parameters with a first number of bits. The second quantizing unit 650 is configured to quantize the adjusted second set of parameters with a second number of bits, the second number being greater than the first number.

In some embodiments, the apparatus 600 may further comprise a fine-tuning unit (not shown). The fine-tuning unit may be configured to, prior to quantizing the adjusted second set of parameters, update the second set of parameters based on the quantized first set of parameters using the training dataset. In some embodiments, the fine-tuning unit may also be configured to update the second set of parameters using the training dataset while keeping the quantized first set of parameters unchanged.

In some embodiments, the first adjusting unit 620 may be further configured to adjust a parameter in the first set of parameters that is greater than an upper limit value of the first range to the upper limit value. The first adjusting unit 620 may also be configured to adjust a parameter in the first set of parameters that is smaller than a lower limit value of the first range to the lower limit value.

In some embodiments, the first quantizing unit 640 may further be configured to divide the first range into a plurality of sub-ranges based on the first number, and determine a quantized value of each parameter in the first set of parameters based on the plurality of sub-ranges and the value of each parameter.

In some embodiments, the apparatus 600 may further comprise a model sending unit (not shown). The model sending unit may be configured to generate a quantized neural network model based on the quantized first set of parameters and the quantized second set of parameters, and to transmit the quantized neural network model to the terminal device.

In some embodiments, the first number may be 4 and the second number may be 8.

In some embodiments, the second part may comprise a linear transformation-based network, and the second set of parameters may comprise weights for the linear transformation. The first part may comprise a convolutional neural network, and the first set of parameters may comprise parameters of a convolution kernel of the convolutional neural network.

In some embodiments, the neural network model may be applicable for voice recognition and include a Transformer-based model.

FIG. 7 illustrates a block diagram of an example device 700 adapted to implement embodiments of the present disclosure. For example, the computing device 110 according to embodiments of the present disclosure may be implemented by the device 700. As shown in FIG. 7, the device 700 comprises a central processing unit (CPU) or a graphics processing unit (GPU) 701 that may perform various appropriate actions and processing based on computer program instructions stored in a read-only memory (ROM) 702 or computer program instructions loaded from a storage unit 708 to a random access memory (RAM) 703. In the RAM 703, there further store various programs and data needed for operations of the device 700. The CPU/GPU 701, ROM 702 and RAM 703 are connected to each other via a bus 704. An input/output (I/O) interface 705 is also connected to the bus 704.

Various components in the device 700 are connected to the I/O interface 705, including: an input unit 706 such as a keyboard, a mouse and the like; an output unit 707 including various kinds of displays and a loudspeaker, etc.; a storage unit 708 including a magnetic disk, an optical disk, and etc.;

a communication unit 709 including a network card, a modem, and a wireless communication transceiver, etc. The communication unit 709 allows the device 700 to exchange information/data with other devices through a computer network such as the Internet and/or various kinds of tele-communications networks.

Various processes and processing described above, e.g., the process 300 and/or process 500 may be executed by the processing unit 701. For example, in some embodiments, the process 300 and/or process 500 may be implemented as a computer software program that is tangibly included in a machine readable medium, e.g., the storage page 708. In some embodiments, part or all of the computer program may be loaded and/or mounted onto the device 700 via ROM 702 and/or communication unit 709. When the computer pro-gram is loaded to the RAM 703 and executed by the CPU 701, one or more acts of the process 300 and/or process 500 as described above may be executed.

The present disclosure may be a method, apparatus, system and/or computer program product. The computer program product may comprise a computer readable storage medium on which computer readable program instructions for executing various aspects of the present disclosure are embodied.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the fore-going. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may com-prise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming lan-guages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, elec-tronic circuitry including, for example, programmable logic circuitry, field-programmable gate arrays (FPGA), or pro-grammable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program prod-ucts according to embodiments of the invention. It will be understood that each block of the flowchart illustrations and/or block diagrams, and combinations of blocks in the flowchart illustrations and/or block diagrams, may be imple-mented by computer readable program instructions.

These computer readable program instructions may be provided to a processing unit of a general purpose computer, special purpose computer, or other programmable data pro-cessing apparatus to produce a machine, such that the instructions, which execute via the processor of the com-puter or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data process-ing apparatus, or other device to cause a series of operational steps to be performed on the computer, other programmable apparatus or other device to produce a computer imple-mented process, such that the instructions which execute on the computer, other programmable apparatus, or other device implement the functions/acts specified in the flow-chart and/or block diagram block or blocks.

The flowchart and block diagrams in the Figures illustrate the architecture, functionality, and operation of possible implementations of systems, methods and computer pro-gram products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

I claim:

1. A method comprising:
updating a neural network model based on a training dataset, wherein the neural network model is applicable for voice recognition and includes a Transformer-based model;
adjusting a first set of parameters of a first part of the updated neural network model to be within a first range;
adjusting a second set of parameters of a second part of the updated neural network model to be within a second range, wherein a size of the second range is greater than a size of the first range;
quantizing the adjusted first set of parameters with a first number of bits; and
quantizing the adjusted second set of parameters with a second number of bits, the second number being greater than the first number,
wherein the first part comprises a linear transformation-based network, and the first set of parameters comprises weights for a linear transformation, and
the second part comprises a convolutional neural network, and the second set of parameters comprises parameters of a convolution kernel of the convolutional neural network.

2. The method according to claim 1, further comprising:
before quantizing the adjusted second set of parameters with the second number of bits,
iteratively updating the adjusted second set of parameters based on the training dataset and the quantized first set of parameters.

3. The method according to claim 2, wherein iteratively updating the adjusted second set of parameters based on the training dataset and the quantized first set of parameters comprises:
iteratively updating the neural network model based on the training dataset while keeping the quantized first set of parameters unchanged, wherein the iteratively updated neural network model comprises an iteratively updated second set of parameters.

4. The method according to claim 1, wherein adjusting the first set of parameters of the first part of the updated neural network model to be within the first range comprises:

adjusting a parameter in the first set of parameters that is greater than an upper limit value of the first range to the upper limit value; and
adjusting a parameter in the first set of parameters that is smaller than a lower limit value of the first range to the lower limit value.

5. The method according to claim 1, wherein quantizing the adjusted first set of parameters with the first number of bits comprises:
dividing the first range into a plurality of sub-ranges based on the first number; and
determining a quantized value of each parameter in the first set of parameters based on the plurality of sub-ranges and a value of each parameter.

6. The method according to claim 1, further comprising:
generating a quantized neural network model based on the quantized first set of parameters and the quantized second set of parameters; and
transmitting the quantized neural network model to a terminal device.

7. The method according to claim 1, wherein the first number is 4 and the second number is 8.

8. The method according to claim 1, wherein updating the neural network model comprises:
updating the neural network model based on a floating point format.

9. A device, comprising:
at least one processing unit; and
at least one memory coupled to the at least one processing unit and having instructions stored thereon, which when executed by the at least one processing unit, cause the device to
update a neural network model based on a training dataset, wherein the neural network model is applicable for voice recognition and includes a Transformer-based model;
adjust a first set of parameters of a first part of the updated neural network model to be within a first range;
adjust a second set of parameters of a second part of the updated neural network model to be within a second range, wherein a size of the second range is greater than a size of the first range;
quantize the adjusted first set of parameters with a first number of bits; and
quantize the adjusted second set of parameters with a second number of bits, the second number being greater than the first number,
wherein the first part comprises a linear transformation-based network, and the first set of parameters comprises weights for a linear transformation; and
the second part comprises a convolutional neural network, and the second set of parameters comprises parameters of a convolution kernel of the convolutional neural network.

10. The device of claim 9, wherein the instructions, when executed by the at least one processing unit, further cause the device to
iteratively update the second set of parameters based on the training dataset and the quantized first set of parameters.

11. The device according to claim 10, wherein the instructions, when executed by the at least one processing unit, further cause the device to
iteratively update the neural network model based on the training dataset while keeping the quantized first set of parameters unchanged, wherein the iteratively updated neural network model comprises an iteratively updated second set of parameters.

12. The device according to claim 9, wherein the instructions, when executed by the at least one processing unit, further cause the device to adjust a parameter in the first set of parameters that is greater than an upper limit value of the first range to the upper limit value; and adjust a parameter in the first set of parameters that is smaller than a lower limit value of the first range to the lower limit value.

13. The device according to claim 9, wherein the instructions, when executed by the at least one processing unit, further cause the device to divide the first range into a plurality of sub-ranges based on the first number; and determine a quantized value of each parameter in the first set of parameters based on the plurality of sub-ranges and a value of each parameter.

14. The device according to claim 9, wherein the first number is 4 and the second number is 8.

15. The device according to claim 9, wherein the instructions, when executed by the at least one processing unit, further cause the device to update the neural network model based on a floating point format.

16. A non-transitory computer-readable storage medium comprising machine-executable instructions that, when executed by a device, cause the device to update a neural network model based on a training dataset, wherein the neural network model is applicable for voice recognition and includes a Transformer-based model;

adjust a first set of parameters of a first part of the updated neural network model to be within a first range;

adjust a second set of parameters of a second part of the updated neural network model to be within a second range, wherein a size of the second range is greater than a size of the first range;

quantize the adjusted first set of parameters with a first number of bits; and quantize the adjusted second set of parameters with a second number of bits, the second number being greater than the first number, wherein the first part comprises a linear transformation-based network, and the first set of parameters comprises weights for a linear transformation; and the second part comprises a convolutional neural network, and the second set of parameters comprises parameters of a convolution kernel of the convolutional neural network.

* * * * *